United States Patent
Carroll (10) Patent No.: US 10,286,740 B2
(45) Date of Patent: May 14, 2019

(54) EXPANDABLE LIGHT TOWERS AND METHODS OF USING

(71) Applicant: Mark D. Carroll, Crown Point, IN (US)

(72) Inventor: Mark D. Carroll, Crown Point, IN (US)

(73) Assignee: Mark D. Carroll, Crown Point, IN (US)

( * ) Notice: Subject to any disclaimer, the term of this patent is extended or adjusted under 35 U.S.C. 154(b) by 18 days.

(21) Appl. No.: 15/454,282

(22) Filed: Mar. 9, 2017

(65) Prior Publication Data

US 2017/0259730 A1    Sep. 14, 2017

Related U.S. Application Data (60) Provisional application No. 62/305,749, filed on Mar. 9, 2016.

(51) Int. Cl.
| | | |
|---|---|---|
| *B60D 1/58* | (2006.01) | |
| *B60P 3/18* | (2006.01) | |
| *B60Q 1/24* | (2006.01) | |
| *F21L 14/04* | (2006.01) | |
| *E04H 12/18* | (2006.01) | |

(Continued)

(52) U.S. Cl.
CPC .............. *B60D 1/58* (2013.01); *B60P 3/18* (2013.01); *B60Q 1/245* (2013.01); *F21L 14/04* (2013.01); *B60Q 1/2657* (2013.01); *B60Q 1/2661* (2013.01); *E04H 12/182* (2013.01); *F21V 21/22* (2013.01); *F21V 21/30* (2013.01); *F21V 23/001* (2013.01); *F21W 2131/10* (2013.01)

(58) Field of Classification Search
CPC .. B60D 1/58; B60P 3/18; B60Q 1/245; B60Q 1/2657; B60Q 1/2661; B60R 9/06; E04H 12/182; F21V 21/22; F21V 21/30; F21V 23/001; F21W 2131/10
See application file for complete search history.

(56) References Cited

U.S. PATENT DOCUMENTS 3,949,218 A * 4/1976 Hayward ............... B60Q 1/245
362/233
4,600,980 A * 7/1986 Dahlgren .............. E04H 12/182
362/385

(Continued)

OTHER PUBLICATIONS

High Intensity LED Work Light on Trailer Hitch Mount—3-8.5 feet—150 Watts-14,790 Lumen; http://www.larsonelectronics.com; Feb. 6, 2017.

*Primary Examiner* — Bao Q Truong (74) *Attorney, Agent, or Firm* — Hartman Global IP Law; Gary M. Hartman; Domenica N. S. Hartman (57) ABSTRACT

Expandable light towers suitable for mounting to a mobile unit, and methods for their use. Such an expandable light tower includes a telescoping assembly comprising first and second telescoping units. The second telescoping unit is telescopically received in the first telescoping unit to configure the expandable light tower to have retracted and extended configurations. The light tower further includes a light-mounting assembly mounted to the second telescoping unit and a mounting assembly coupled to the first telescoping unit and adapted to mount the telescoping assembly to a hitch of a mobile unit. The mounting assembly enables the telescoping assembly to pivot about a transverse axis.

20 Claims, 11 Drawing Sheets

(51) Int. Cl.
  *F21V 21/22* (2006.01)
  *F21V 21/30* (2006.01)
  *F21V 23/00* (2015.01)
  *F21W 131/10* (2006.01)
  *B60Q 1/26* (2006.01)

(56) References Cited

U.S. PATENT DOCUMENTS

| | | | | |
|---|---|---|---|---|
| 7,780,323 | B2* | 8/2010 | Nolle | B60P 3/18 |
| | | | | 280/477 |
| 7,954,836 | B2* | 6/2011 | Mann | B60R 3/02 |
| | | | | 280/163 |
| 7,989,979 | B2* | 8/2011 | Burgess | B60Q 1/245 |
| | | | | 307/10.1 |
| 2008/0061097 | A1 | 3/2008 | Milender et al. | |
| 2009/0201689 | A1 | 8/2009 | Nolle | |
| 2016/0086525 | A9 | 3/2016 | White | |

* cited by examiner

FIG. 11

EXPANDABLE LIGHT TOWERS AND METHODS OF USING

CROSS REFERENCE TO RELATED APPLICATIONS

This application claims the benefit of U.S. Provisional Application No. 62/305,749, filed Mar. 9, 2016, the contents of which are incorporated herein by reference.

BACKGROUND OF THE INVENTION

The present invention generally relates to portable lighting units.

Various types of lighting units have been proposed that are capable of being transported and used in outdoor environments. Nonlimiting examples include U.S. Patent Application Publication Nos. 2009/0201689 and 2016/0086525. The former application discloses an illumination apparatus that comprises an illumination unit equipped with a coupling unit configured to be received in the receiver of a vehicle receiver hitch. The illumination unit is mounted to the coupling unit with an extendable stand that allows the illumination unit to be erected at a desired illumination elevation. The coupling unit can be pivoted to rotate about the axis of the vehicle receiver hitch, such that the apparatus can be rotated in a lateral plane of the vehicle between a horizontal transport position and a vertical operating position. Three base elements are disposed at the base of the illumination apparatus to stabilize the apparatus.

BRIEF DESCRIPTION OF THE INVENTION

The present invention provides expandable light towers suitable for mounting to a mobile unit, and methods for their use.

According to one aspect of the invention, the expandable light tower includes a telescoping assembly comprising first and second telescoping units, wherein the second telescoping unit is telescopically received in the first telescoping unit to configure the expandable light tower to have retracted and extended configurations. A light-mounting assembly is mounted to the second telescoping unit, and mounting means is coupled to the first telescoping unit and adapted to mount the telescoping assembly to a hitch of a mobile unit and enable the telescoping assembly to pivot about a transverse axis of the mobile unit.

According to other aspects of the invention, the mobile unit may be a motorized vehicle, for example, a pickup truck, a wheeled cart, etc.

Other aspects of the invention include methods of operating light towers comprising the elements described above.

Technical effects of light towers having the features described above include the ability to provide a mobile lighting unit for use in a wide variety of situations and applications, including construction, industrial, and emergency scenarios.

Other aspects and advantages of this invention will be better appreciated from the following detailed description.

DETAILED DESCRIPTION OF THE INVENTION

Figure 1:
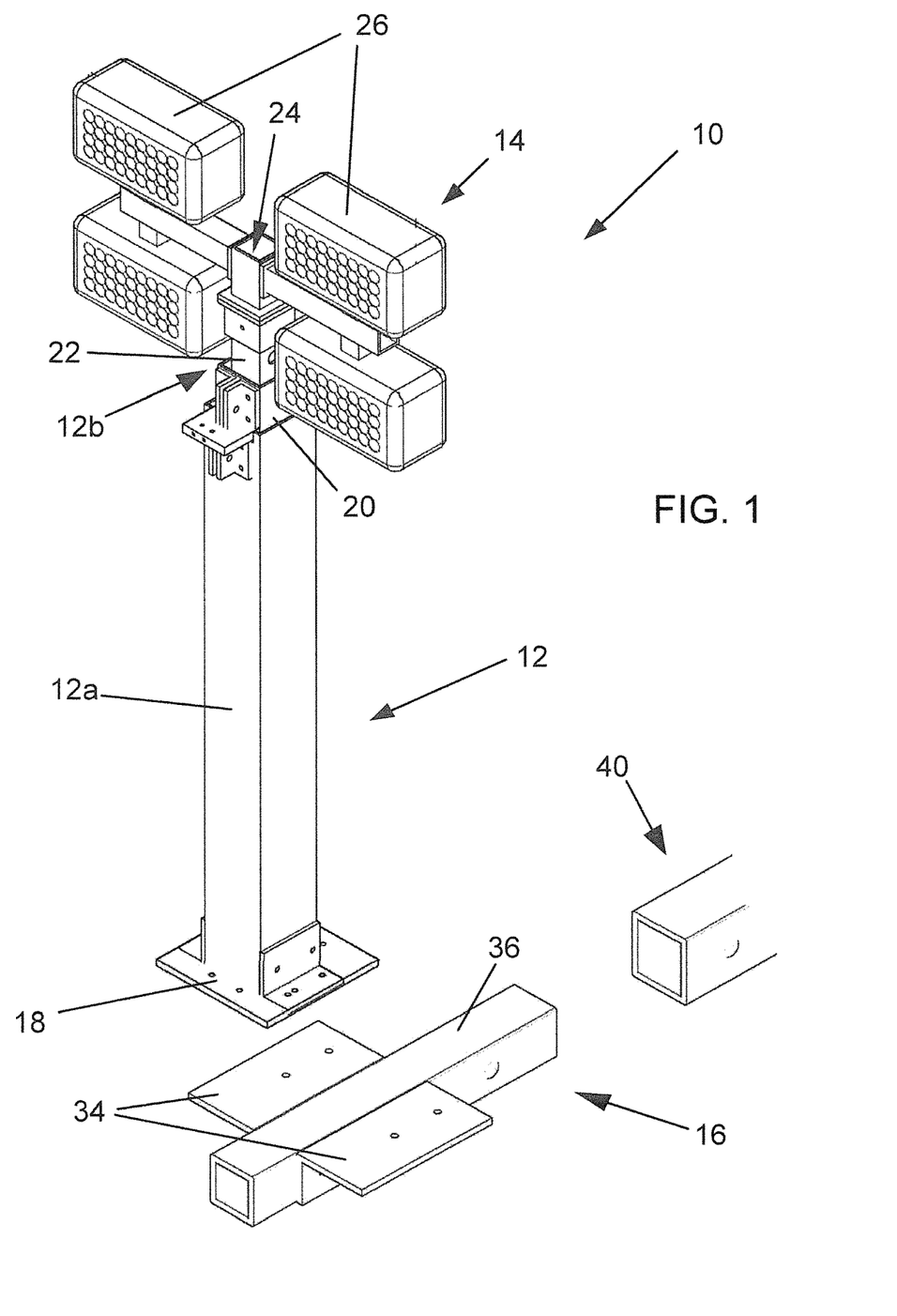
FIG. 1 schematically represents an exploded view of an extendable and retractable light tower in an erect orientation and a retracted configuration in accordance with a nonlimiting embodiment of this invention.
Figure 3:
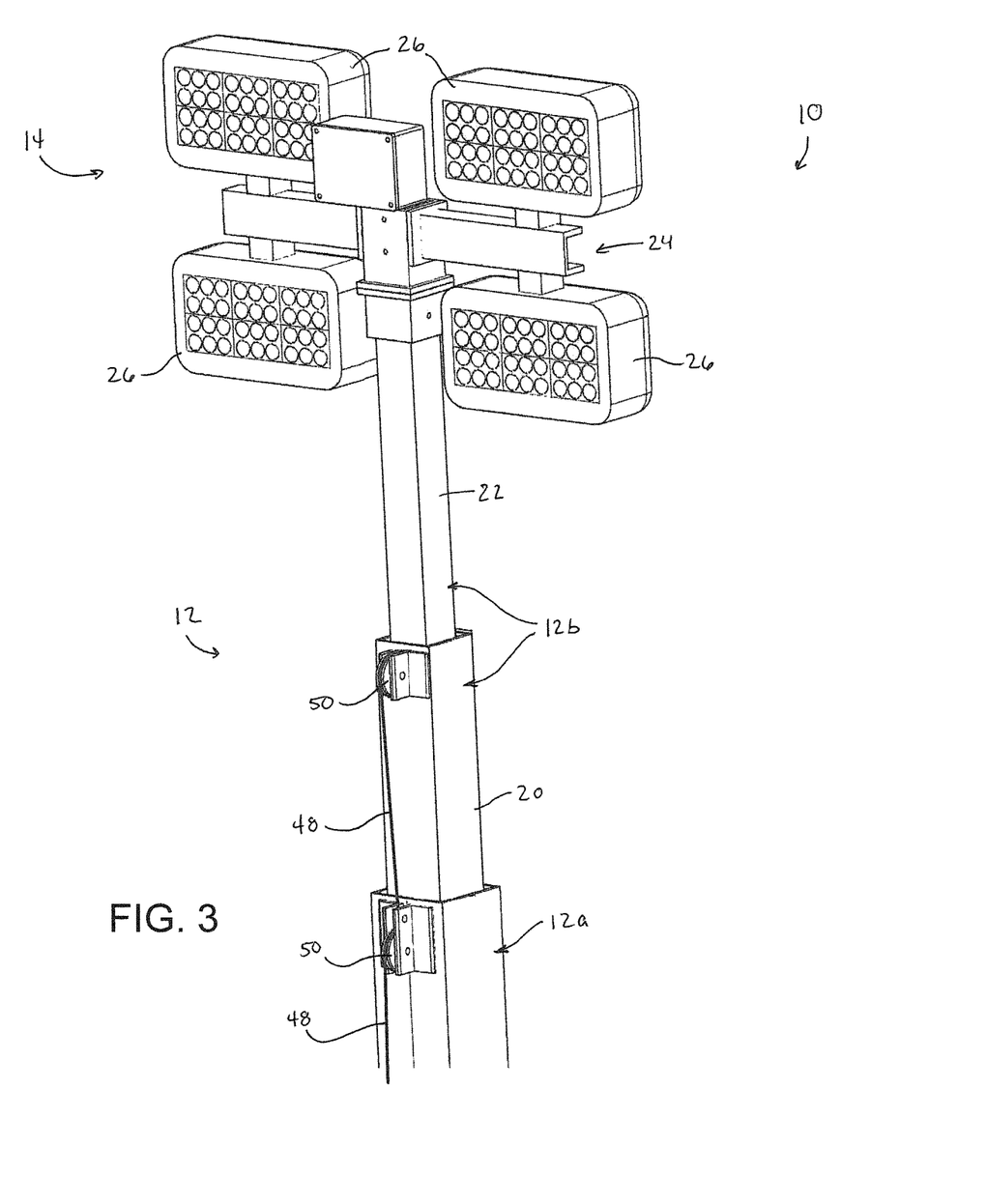
FIG. 3 schematically represents the light tower of FIG. 1 in its erect orientation and in an extended configuration in accordance with a nonlimiting embodiment of this invention.

FIG. 1 schematically represents an extendable and retractable light tower 10 in accordance with a nonlimiting embodiment of the invention. The light tower 10 is represented as being mountable to a hitch 40, for example, a Reese hitch (receiver) of a vehicle (such as a pickup truck) or other type of mobile unit, as nonlimiting examples, steam rollers, dump trucks, golf carts, wheelers, etc. Other configurations for the light tower 10 include the ability to be mounted to a wheeled cart (dolly) or similar mobile unit. The light tower 10 is shown in FIG. 1 in what is referred to herein as a retracted configuration and a vertical erect orientation, and is configured so that a telescoping assembly 12 of the tower 10 can be extended to arrive at what is referred to herein as an extended configuration of the tower 10, a nonlimiting example of which is shown in FIG. 3. As discussed in more detail below, the light tower 10 is also configured so that its telescoping assembly 12 can be rotated downward to arrive at what is referred to herein as an inclined orientation of the tower 10. The tower 10 further has a lighting unit 14 at its upper end.

To facilitate the description provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to the orientation of the light tower 10 when installed for use as represented in the drawings, and therefore are relative terms that indicate the construction, installation and use of the invention and therefore help to define the scope of the invention.

The light tower 10 shown in FIG. 1 includes the aforementioned telescoping assembly 12 and a mounting assembly 16, shown disassembled from each other in FIG. 1. The telescoping assembly 12 includes a lower telescoping unit 12a configured as a tubular-shaped member, and an elongate upper telescoping unit 12b telescopically received in an opening in the upper end of the lower telescoping unit 12a. The lower end of the lower telescoping unit 12a is equipped with a mounting member 18 for securing the telescoping assembly 12 to the mounting assembly 16. The upper telescoping unit 12b is represented as comprising two tubular-shaped telescoping members 20 and 22, one being an intermediate telescoping member 20 that is telescopically received in the lower telescoping unit 12a, and the second being an uppermost telescoping member 22 telescopically received in the intermediate telescoping member 20. Though the intermediate and uppermost telescoping members 20 and 22 are shown as tubular shapes, it is foreseeable that structures other than tubular-shaped members could be employed. Furthermore, while the telescoping assembly 12 is shown as comprising three primary components (a lower telescoping unit 12a and intermediate and uppermost telescoping members 20 and 22), it is within the scope of the invention that fewer or more telescoping structures could be used.

In the embodiment shown in FIG. 1, the upper telescoping unit 12b is telescopically received in the opening of the lower telescoping unit 12a to enable the telescoping assembly 12 to be at least partially telescopically expanded to an extended configuration (for example, as shown in FIG. 3), in which the intermediate telescoping member 20 telescopically extends from the opening of the lower telescoping unit 12a and the uppermost telescoping member 22 telescopically extends from an opening in the upper end of the intermediate telescoping member 20 to increase the height of the tower 10, for example, to a height of about twelve feet (about four meters) or more. The intermediate and uppermost telescoping members 20 and 22 can also be telescopically retracted to acquire the retracted configuration (for example, as shown in FIG. 1) in which the upper telescoping unit 12b (comprising the intermediate and uppermost telescoping members 20 and 22) is almost entirely stowed within the lower telescoping unit 12a. The retracted configuration of the telescoping assembly 12 may have a height of about six feet (about two meters) or less. FIGS. 3 through 6 represent that a hand-operated winch 38, cables 48, and pulleys 50 can be used to extend and retract the telescoping assembly 12 of the tower 10, though it is foreseeable that a powered winch or actuator could be used for this purpose. The winch 38 may be equipped with a braking mechanism of a type known in the art. As will be discussed in reference to FIGS. 8 through 11, the mounting assembly 16 of the light tower 10 is preferably configured to enable the entire telescoping assembly 12 to pivot relative to a hitch (the Reese hitch 40 of FIGS. 1 and 9) to which it is mounted, enabling the tower 10 to be oriented and secured in at least a vertical erect orientation (FIG. 1) and also an inclined orientation, for example, a fully horizontal lowered orientation indicated in FIG. 11.

Figure 2:
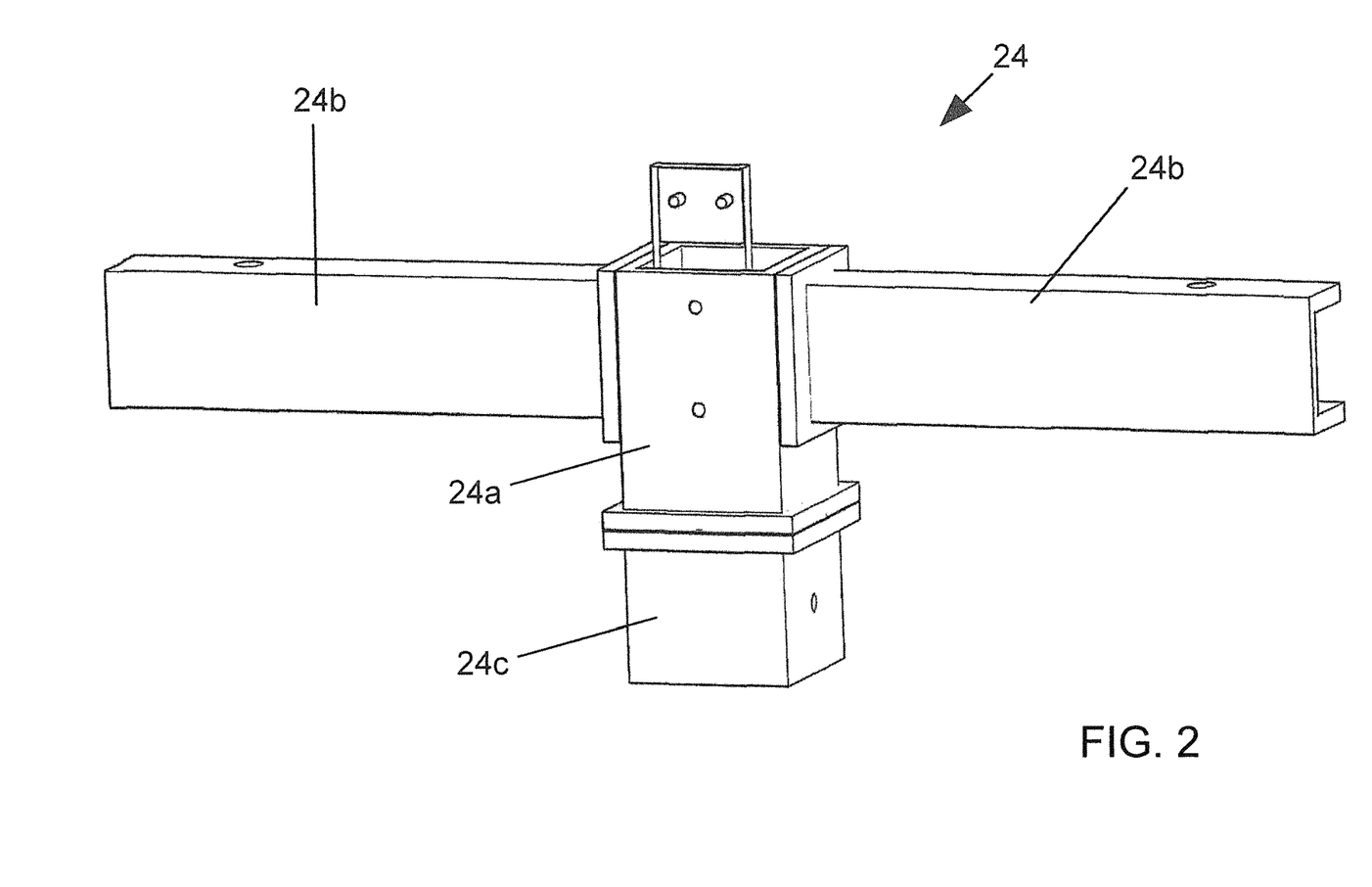
FIG. 2 schematically represents a light-mounting assembly of the light tower of FIG. 1.

FIG. 1 depicts the uppermost telescoping member 22 of the upper telescoping unit 12b as having the lighting unit 14 of the tower 10 mounted at its upper end. The lighting unit 14 comprises a light-mounting assembly 24 (FIG. 2) having a base 24a and lateral arms 24b to which individual light fixtures 26 of the lighting unit 14 are mounted. A single base 24a and two oppositely-disposed lateral arms 24b are depicted in FIGS. 1 and 2, though it is foreseeable that additional lateral arms could extend from the base 24a, and/or additional bases could be attached to the lateral arms 24a from which additional lateral arms could be mounted and extend. The embodiment of the lighting unit 14 represented in the drawings comprises multiple panels of lighting fixtures 26 for generating visible light. The lighting fixtures 26 may be any of a wide variety of lighting equipment, though in preferred embodiments the lighting unit 14 comprises LED lights that can be powered by a DC power supply system (e.g., 9-32 VDC). As a nonlimiting example, a suitable LED light may produce 22,000 lumens (e.g., luminous flux of about 5000 lumens per fixture and up to 90 lumens per watt) or more of true white light (e.g., color temperature of 6500K), and have a 50,000 hour life span.

Figure 4:
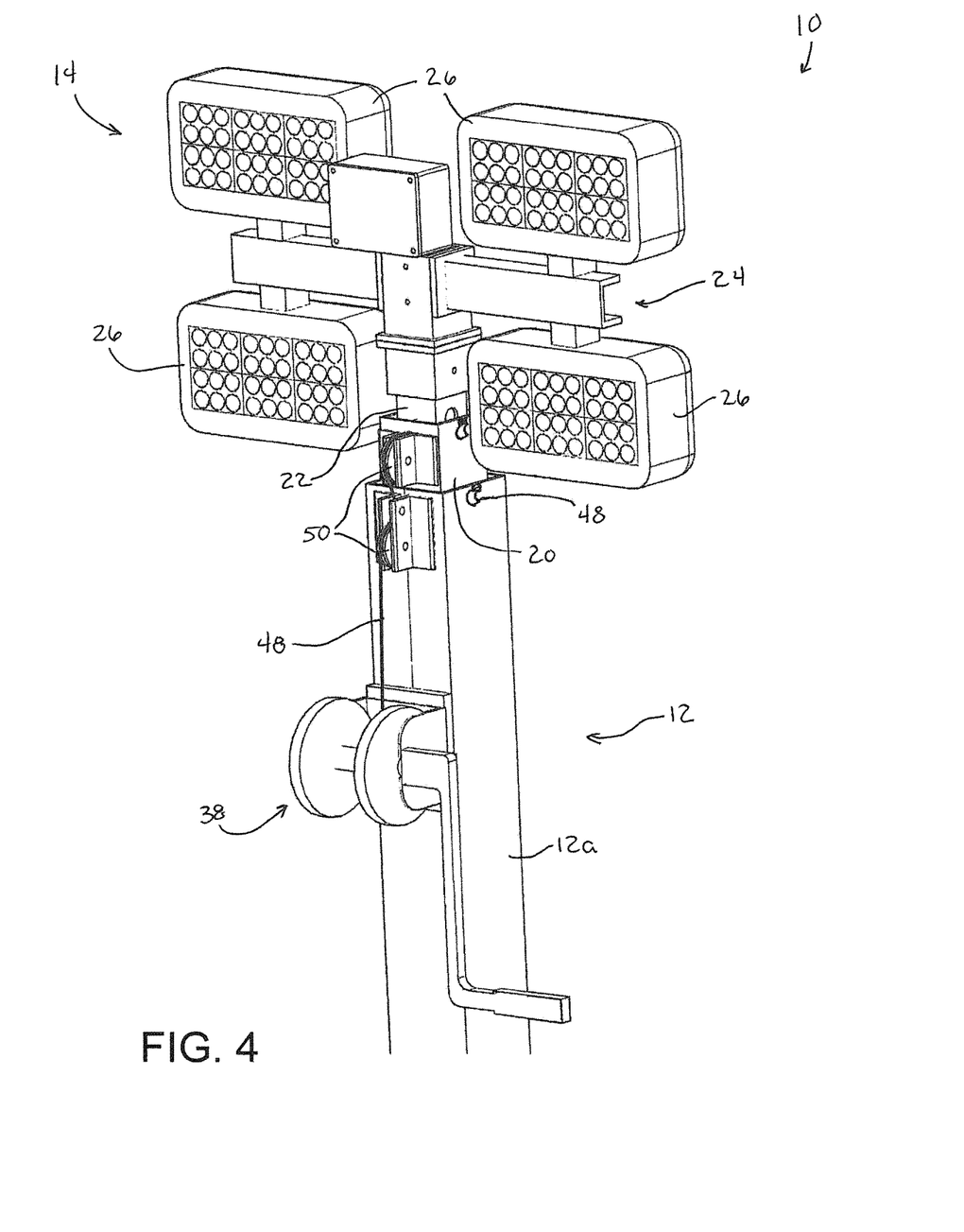
FIGS. 4, 5, and 6 schematically represent three different orientations for the light-mounting assembly of the light tower of FIG. 1.
Figure 5:
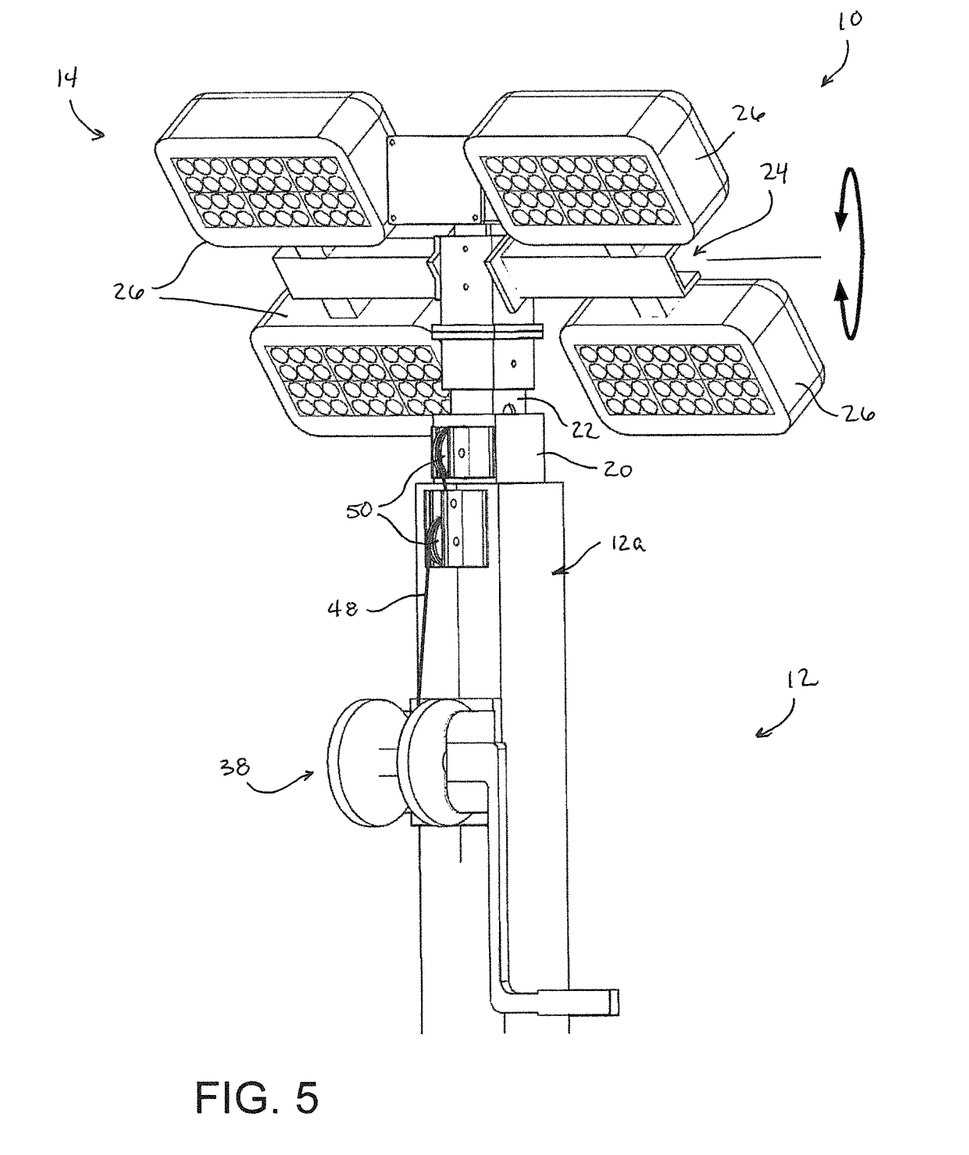
Figure 6:
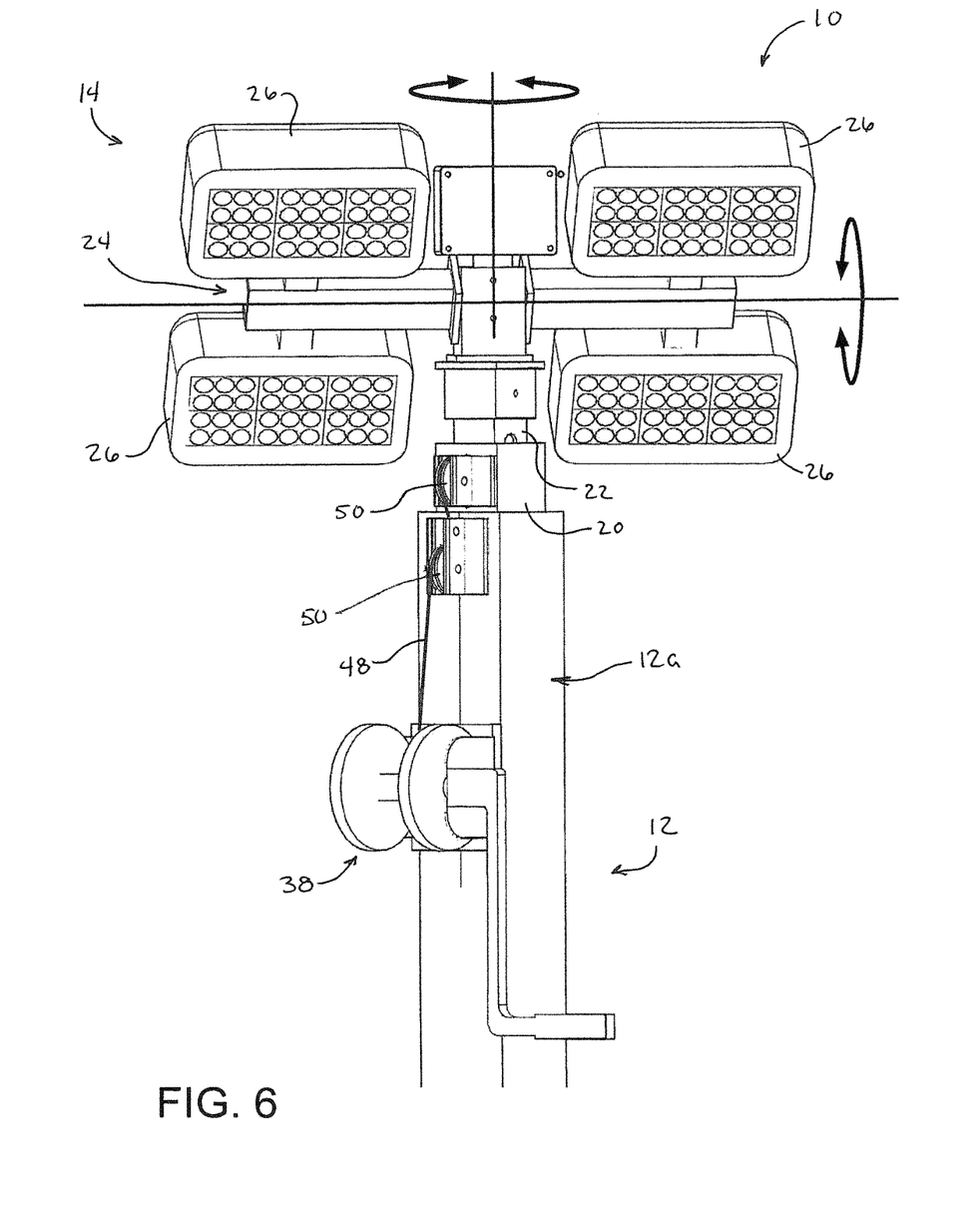

The light-mounting assembly 24 is preferably capable of enabling the light fixtures 26 to be rotated vertically and horizontally, for example, 360 degrees about the vertical axis of the upper telescoping unit 12b and 360 degrees about a horizontal axis of the light-mounting assembly 16. For example, FIG. 4 represents the light-mounting assembly 24 in a null position, FIG. 5 represents the individual lateral arms 24b of the light-mounting assembly 24 as having been rotated about their common longitudinal axis (corresponding to the horizontal axis of the light-mounting assembly 16) to direct lighting in a downward direction, and FIG. 6 represents the entire light-mounting assembly 24 as having been rotated about the longitudinal axis of its base 24a (shown as aligned with the axis of the telescoping assembly 12) as well as about the horizontal axis of the light-mounting assembly 16 to direct lighting in downward and lateral directions. Rotation of the lateral arms 24b about their common longitudinal axis can be achieved by a simple axle joint (not shown) that connects the arms 24b to the base 24a, and rotation of the base 24a about its longitudinal axis can be similarly achieved by a simple axle joint (not shown) that connects the base 24a to a cap 24c attached to the uppermost end of the upper telescoping unit 12b.

Figure 7:
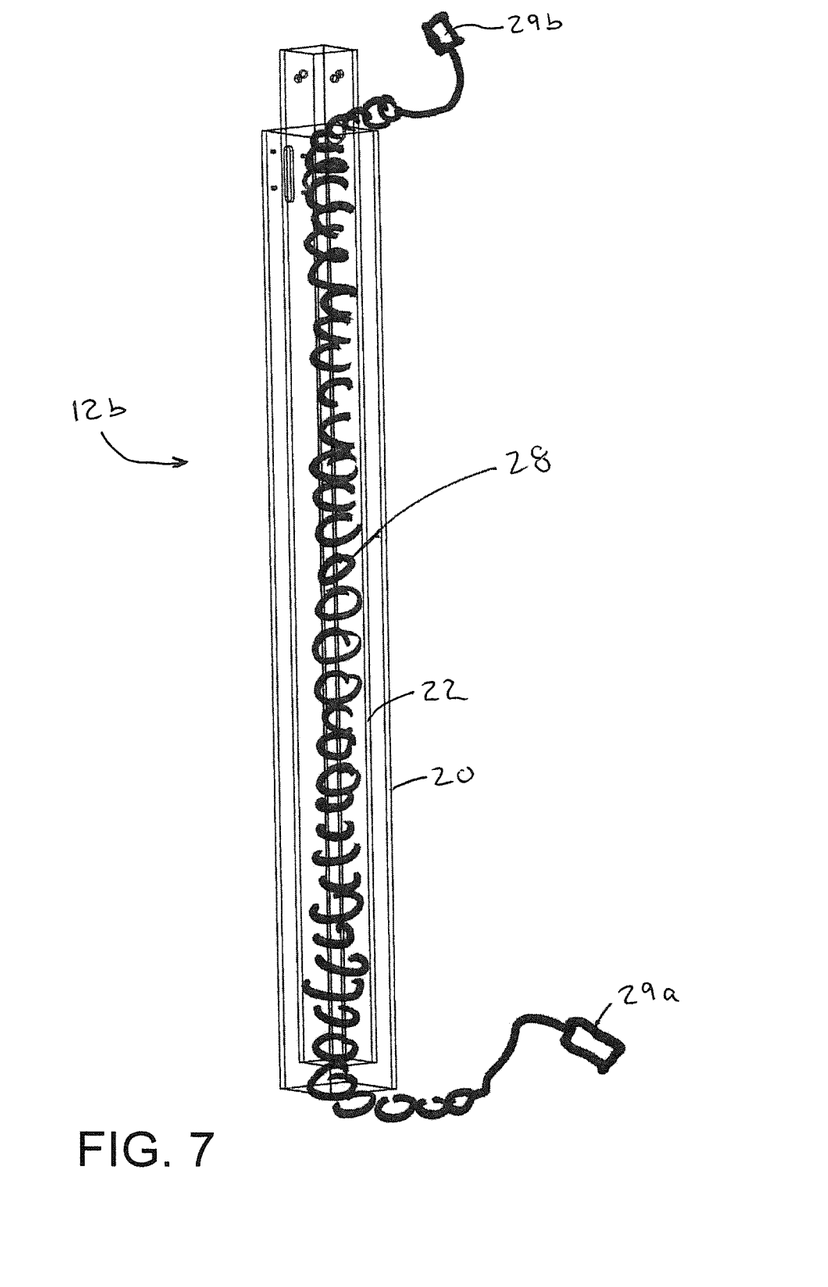
FIG. 7 schematically represents wiring routed through a telescoping section of the light tower of FIG. 1.

FIG. 7 schematically represents a coiled power cable 28 routed through the intermediate telescoping member 20 of the upper telescoping unit 12b for delivering electric current to the tower 10 from a suitable power source. FIG. 4 depicts optional grounding clips 48 attached to the telescoping unit 12 to reduce the required overall positive wire gauge of the power cable 28. Suitable power sources include, for example, 12 VDC battery power available on a mobile unit to which the tower 10 is mounted. Alternatively or in addition, DC current could be supplied by a separate 12 VDC battery or 120 VAC power supply, or the tower 10 could be equipped with rechargeable batteries so that the light fixtures 26 can be operated without being plugged into a separate power supply. In the embodiment shown, the power cable 28 can utilize a four- to seven-way quick-disconnect plug 29a adapted to plug into the 12 VDC power supply of a motor vehicle. The power cable 28 has a second quick-disconnect plug 29b for connecting to the light fixtures 26 or any other desired light sources (for example, a directional sign, a stop sign, strobe lights, any combination of lights and signs, etc.), as well as other electronic devices that may be associated with the tower 10, for example, a GPS unit, communication relay device, communication amplifier, etc. A switching unit (not shown) may be incorporated into the power cable 28 to enable the light fixtures 26 to receive electrical power by operating a manual switch on the tower 10 or wirelessly operating the switching unit with a remote switch, for example, via a key fob, smart phone, or other computer device.

Figure 8:
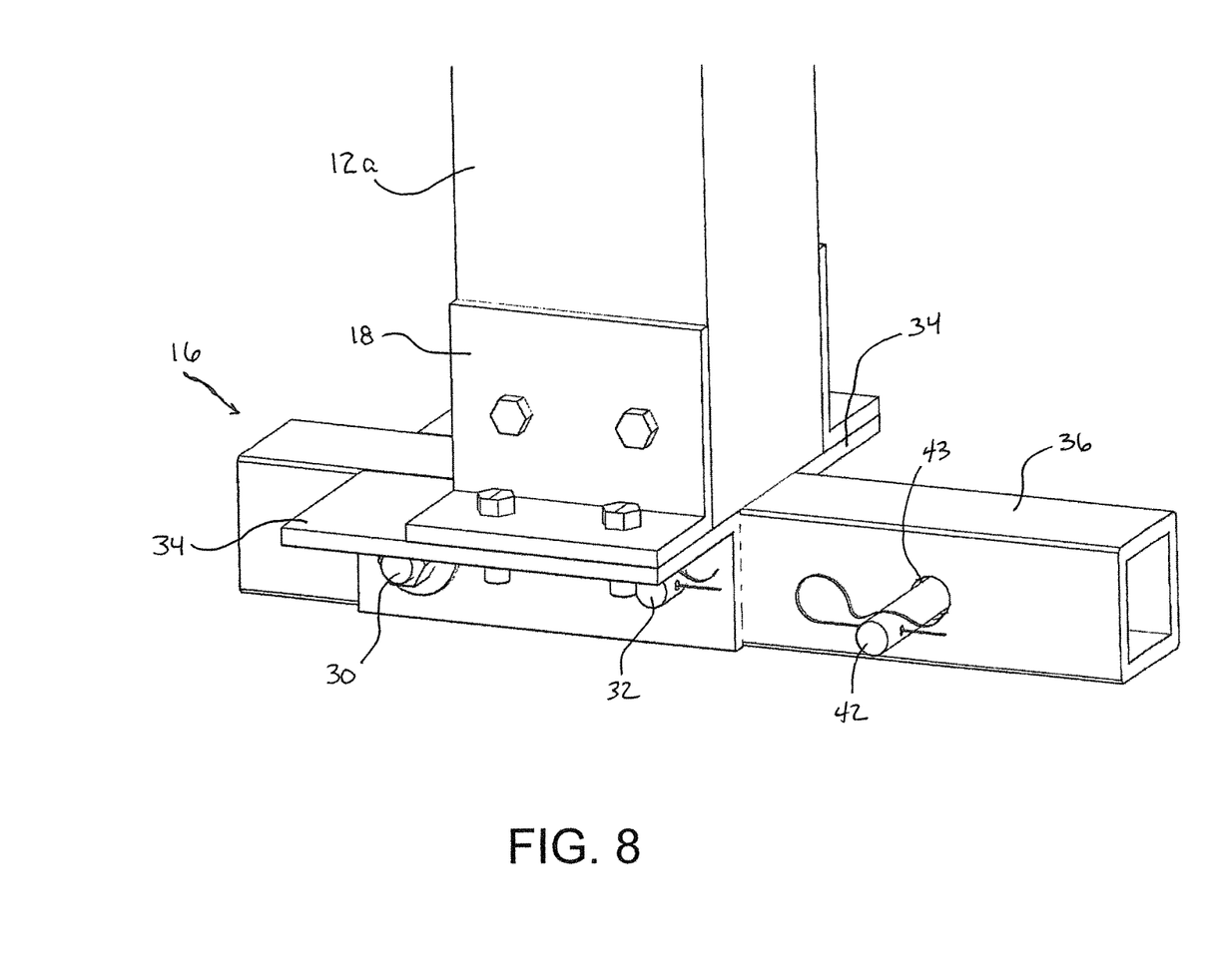
FIGS. 8 and 9 schematically represent a hitch mounting assembly of the light tower of FIG. 1, wherein the hitch mounting assembly is configured to position the light tower in its erect orientation.
Figure 9:
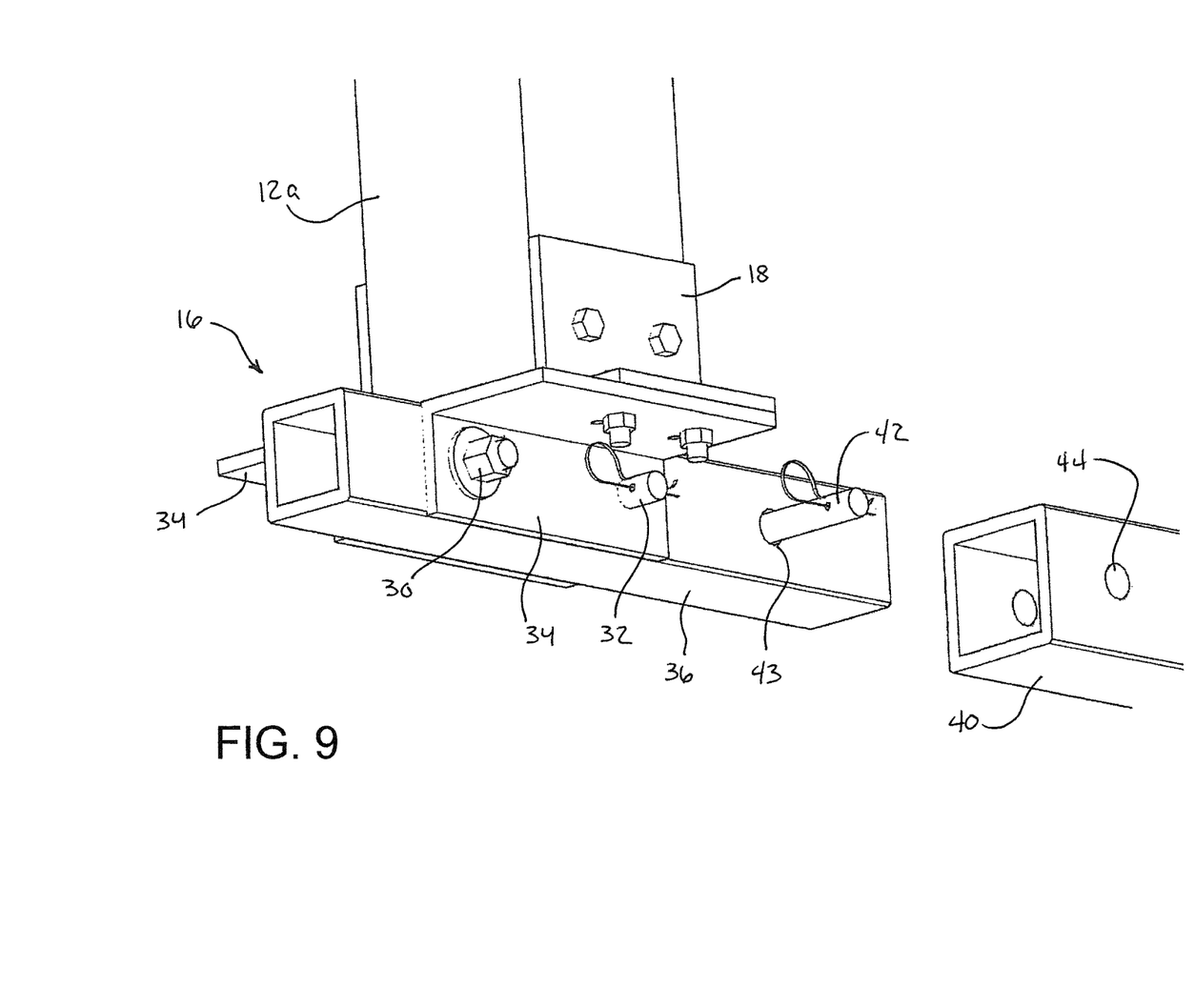
Figure 10:
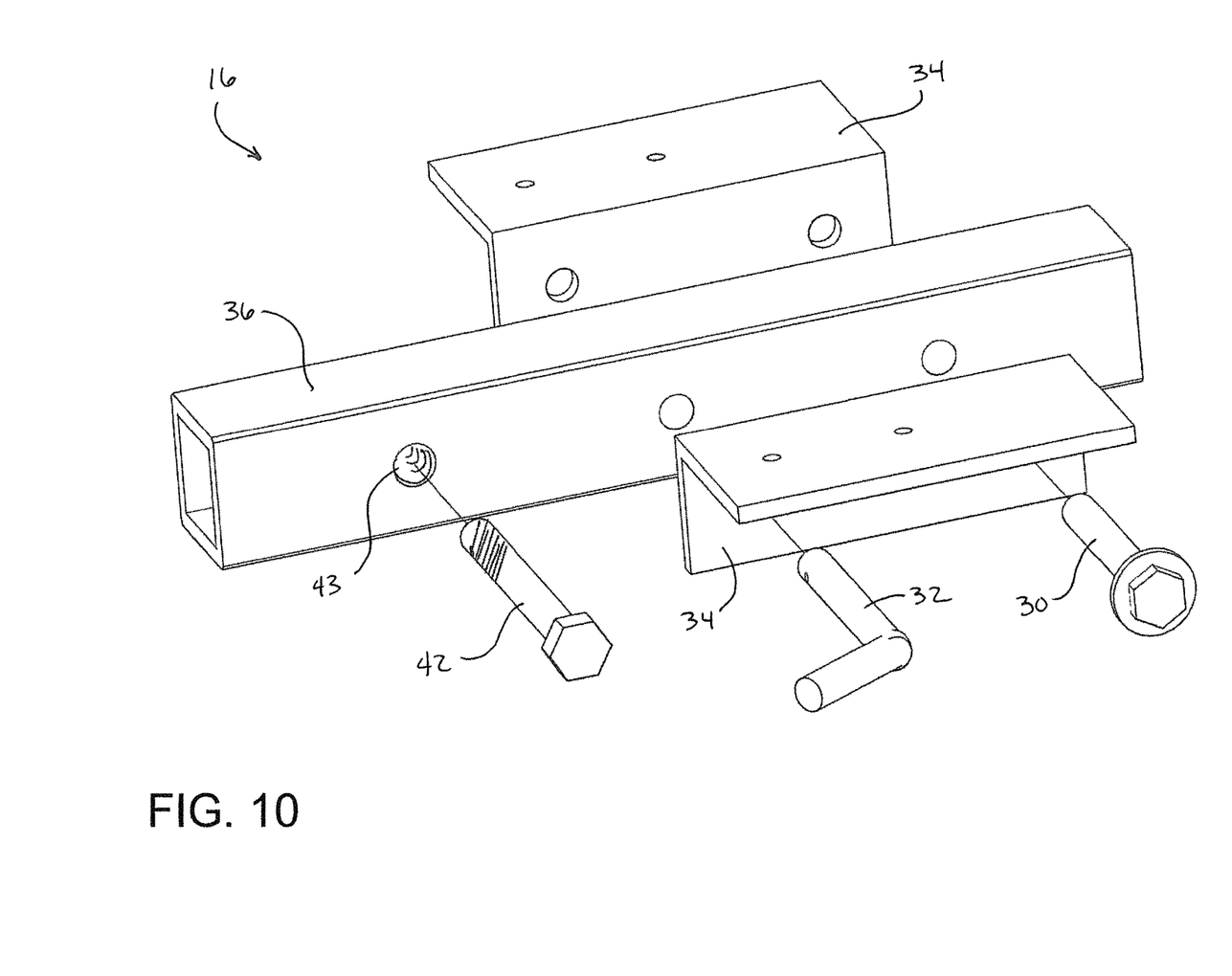
FIG. 10 schematically represents an exploded view of the hitch mounting assembly of FIGS. 8 and 9.
Figure 11:
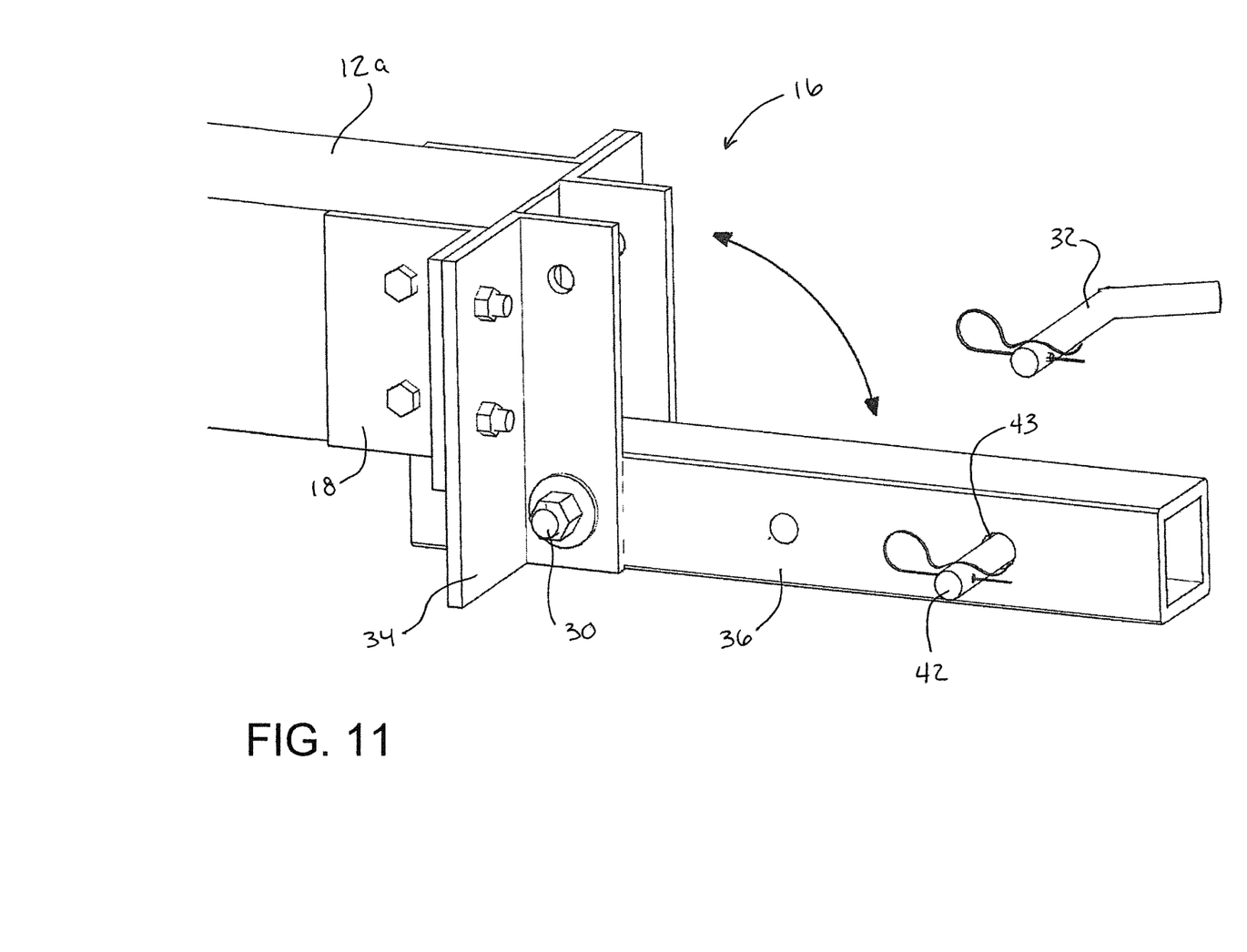
FIG. 11 schematically represents the hitch mounting assembly of FIGS. 8 through 10 configured to position the light tower in an inclined orientation.

FIGS. 8 through 11 provide additional depictions of the mounting assembly 16 seen in FIG. 1. FIGS. 8 and 9 show the mounting assembly 16 securing the telescoping assembly 12 in its vertical erect orientation, and FIG. 9 further shows the mounting assembly 16 aligned for being coupled to a Reese hitch 40. FIG. 11 shows the mounting assembly 16 orienting the telescoping assembly 12 in its fully horizontal lowered orientation. If the light tower 10 is mounted to a hitch of a pickup truck, the fully horizontal lowered position enables the tailgate of the truck to be fully opened.

The mounting assembly 16 is shown in FIGS. 8 through 11 as comprising a hitch member 36 having a tubular section sized and configured for coupling to the hitch 40, for example, having a rectangular (square) cross-sectional shape sized to be inserted into and secured to a Reese hitch 40 having a complementary tubular section, as represented in FIG. 9. The complementary rectangular-shaped cross-sections of the hitch member 36 and hitch 40 inhibit swaying and other movement of the telescoping assembly 12 while erect by limiting the rotational and longitudinal movement of the hitch member 36 about and along the longitudinal axis of the hitch 40. The mounting assembly 16 further comprises a pair of flanges 34 that are pivotally coupled to the hitch member 36 with a pivot pin 30 so as to sandwich therebetween a portion of the longitudinal (axial) length of the hitch member 36. The pivot pin 30 is oriented to have a lateral axis that is transverse to the longitudinal axis of the hitch member 36. The mounting member 18 located at the lower end of the lower telescoping unit 12a of the telescoping assembly 12 is secured to the flanges 34 to mount the telescoping assembly 12 to the mounting assembly 16. In FIGS. 8 and 9, a clevis pin 32 passes through the flanges 34 and hitch member 36 to prevent the telescoping assembly 12 from pivoting relative to the mounting assembly 16 about the pivot pin 30. As such, the pivot pin 30 defines a pivot axis for the telescoping assembly 12 and the clevis pin 32 secures the telescoping assembly 12 to the mounting assembly 16 to orient and secure the tower 10 in its vertical erect orientation. In FIG. 11, the clevis pin 32 has been removed to enable the telescoping assembly 12 to pivot relative to the mounting assembly 16 about the lateral axis of the pivot pin 30, such that the telescoping assembly 12 has been rotated within a plane that contains the telescoping assembly 12 and hitch member 36 and is preferably (though not necessarily) parallel to the longitudinal (roll) axis of a vehicle to which the hitch 40 is mounted. From FIG. 11, it can be seen that the flanges 34 are located a distance from the end of the hitch member 36, and that the mounting member 18 of the telescoping assembly 12 cooperates with the pivot pin 30 and hitch member 36 to create a stop that positively establishes the horizontal lowered orientation of the tower 10. In the embodiment shown in the drawings, the positive stop results in the telescoping assembly 12 being approximately parallel to the hitch member 36 in the fully horizontal lowered orientation.

FIGS. 8 through 11 show the mounting assembly 16 as equipped with a hitch pin 42 that passes through the hitch member 36 via a transverse hole 43. The hitch pin 42 is also configured to pass through a complementary hole 44 in the hitch 40 (FIG. 9) when the hitch member 36 is received within the hitch 40 to secure the mounting assembly 16 to the hitch 40. As shown in FIG. 10, the hitch pin 42 and its complementary hole 43 may be threaded, such that tightening the pin 42 serves to pull the hitch member 36 to one side of the hitch 40. If sufficiently tightened, the pin 42 is able to clamp the hitch member 36 against one of the interior walls of the hitch 40 to effectively serve as an anti-sway mechanism that further inhibits the telescoping assembly 12 from moving and swaying while erect. In particular, clamping the hitch member 36 against an interior wall of the hitch 40 limits if not prevents rotational and longitudinal movement of the hitch member 36 about and along the longitudinal axis of the hitch 40. As such, the tower 10 does not require and can completely omit any extraneous stabilizers that brace the tower 10 against its surroundings.

The configuration of the light tower 10 shown in FIGS. 1 through 11 allows the tower 10 to be mounted with the mounting assembly 16 to a hitch of a motor vehicle, and thereafter can be selectively extended and retracted between the extended and retracted configurations and selectively pivoted between the vertical erect and horizontal lowered orientations. The ability to retract the telescoping assembly 12 facilitates its handling by reducing the profile of the tower 10 while it is transported on a vehicle to which it is mounted. If the tower 10 is mounted to a hitch of a pickup truck, the ability to lower the telescoping assembly 12 to a horizontal orientation allows the tailgate of the truck to be lowered for loading and unloading the bed of the truck.

Various materials can be used in the construction of the light tower 10 to enable the tower 10 to withstand long-term outdoor exposures in harsh environments. As nonlimiting examples, suitable materials for use in the construction of the tower 10 include aluminum, stainless steel hardware, and ultrahigh molecular weight (UHMW) plastics such as polyethylene.

While the invention has been described in terms of a particular embodiment, it is apparent that other forms could be adopted by one skilled in the art. For example, the tower 10 and its components could differ in appearance and construction from the embodiment described herein and shown in the drawings, functions of certain components of the tower 10 could be performed by components of different construction but capable of a similar (though not necessarily equivalent) function, and appropriate materials could be substituted for those noted. Accordingly, it should be understood that the invention is not limited to any embodiment described herein or illustrated in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. An expandable light tower configured for mounting to a mobile unit having a hitch having a longitudinal axis, the expandable light tower comprising:
   a telescoping assembly comprising first and second telescoping units, the second telescoping unit being telescopically received in the first telescoping unit to configure the expandable light tower to have retracted and extended configurations;
   a light-mounting assembly mounted to the second telescoping unit;
   mounting means coupled to the first telescoping unit and adapted to mount the telescoping assembly to the hitch of the mobile unit and enable the telescoping assembly to pivot about a transverse axis of the mounting means that is transverse to the longitudinal axis of the hitch, the mounting means comprising a hitch member for coupling to the hitch of the mobile unit to extend along the longitudinal axis of the hitch, a mounting member coupled to an end of the first telescoping unit, a pivot pivotally coupling the hitch member and the mounting member and about which the telescoping assembly pivots about the transverse axis of the mounting means, and means for coupling the hitch member to the mounting member to prevent the telescoping assembly from pivoting about the pivot; and
   an anti-sway mechanism that limits movement of the expandable light tower by preventing rotational movement of the hitch member about a longitudinal axis of the hitch member.

2. The expandable light tower according to claim 1, wherein the telescoping assembly pivots about the transverse axis of the mounting means to orient and secure the expandable light tower in at least an erect orientation and an inclined lowered orientation.

3. The expandable light tower according to claim 2, wherein the erect orientation is a vertical erect orientation and the inclined lowered orientation is a horizontal lowered orientation.

4. The expandable light tower according to claim 2, wherein the hitch member cooperates with the mounting means to create a stop that positively establishes the inclined lowered orientation of the expandable light tower.

5. The expandable light tower according to claim 2, wherein the light-mounting assembly is configured to rotate relative to the telescoping assembly about a vertical axis and a horizontal axis when the expandable light tower is in the erect orientation.

6. An expandable light tower mounted to a mobile unit having a hitch having a longitudinal axis that is parallel to a longitudinal (roll) axis of the mobile unit, the expandable light tower comprising:
  a telescoping assembly comprising first and second telescoping units, the first telescoping unit having upper and lower ends, the upper end having an opening therein and the lower end having a mounting member, the second telescoping unit being telescopically received in the opening of the first telescoping unit to configure the expandable light tower to have a retracted configuration in which the second telescoping unit is at least partially telescopically retracted into the opening of the first telescoping unit and an extended configuration in which the second telescoping unit telescopically extends farther from the opening of the first telescoping unit relative to the retracted configuration;
  a light-mounting assembly mounted to the second telescoping unit;
  means for generating visible light mounted to the light-mounting assembly;
  means for delivering electric current from a power source to the light-generating means; and
  mounting means coupled to the mounting member of the first telescoping unit for mounting the telescoping assembly to the hitch of the mobile unit and enabling the telescoping assembly to pivot about a transverse axis of the mounting means that is transverse to the longitudinal axis of the hitch, the mounting means comprising a hitch member coupled to the hitch and extending along the longitudinal axis of the hitch, a mounting member coupled to an end of the first telescoping unit, pivoting means pivotally coupling the hitch member and the mounting member for enabling the telescoping assembly to pivot relative to the mounting means such that the telescoping assembly pivots about the transverse axis of the mounting means and rotates within a plane that contains the hitch, the telescoping assembly and the hitch member, and means for coupling the hitch member to the mounting member to prevent the telescoping assembly from pivoting about the pivoting means.

7. The expandable light tower according to claim 6, wherein the telescoping assembly pivots about the transverse axis of the mounting means to orient and secure the expandable light tower in at least an erect orientation and an inclined lowered orientation in which the telescoping assembly extends parallel to the longitudinal (roll) axis of the mobile unit.

8. The expandable light tower according to claim 7, wherein the erect orientation is a vertical erect orientation and the inclined lowered orientation is a horizontal lowered orientation.

9. The expandable light tower according to claim 7, wherein the hitch member cooperates with the pivot means and hitch member to create a stop that positively establishes the inclined lowered orientation of the expandable light tower.

10. The expandable light tower according to claim 7, wherein the telescoping assembly is approximately parallel to the hitch member of the mounting means when the expandable light tower is in the inclined lowered orientation.

11. The expandable light tower according to claim 7, wherein the light-generating means are configured to rotate relative to the telescoping assembly about a vertical axis and a horizontal axis when the expandable light tower is in the erect orientation.

12. The expandable light tower according to claim 6, wherein the second telescoping unit comprises a first tubular member telescopically received in the opening of the first telescoping unit and a second tubular member telescopically received in an opening of the first tubular member.

13. The expandable light tower according to claim 6, wherein the extended configuration has a height of at least four meters.

14. The expandable light tower according to claim 6, wherein the retracted configuration has a height of two meters or less.

15. The expandable light tower according to claim 6, wherein the mobile unit is a motorized vehicle and the expandable light tower is mounted to the motorized vehicle as a result of the hitch member being coupled to the hitch of the motorized vehicle.

16. The expandable light tower according to claim 15, wherein the hitch is a Reese hitch.

17. The expandable light tower according to claim 15, wherein the motorized vehicle is a pickup truck having a tailgate, and the inclined lowered orientation of the expandable light tower enables the tailgate of the pickup truck to be fully opened.

18. The expandable light tower according to claim 6, wherein the mounting means comprises an anti-sway mechanism.

19. The expandable light tower according to claim 18, wherein the anti-sway mechanism limits movement of the expandable light tower by inhibiting rotational and longitudinal movement of the hitch member about and along the longitudinal axis of the hitch.

20. A method of using the expandable light tower of claim 6, the method comprising:
  mounting the light tower assembly with the mounting means to the hitch of the mobile unit;
  selectively extending and retracting the telescoping assembly between the extended and retracted configurations thereof and selectively pivoting the light tower assembly between the erect orientation and the inclined lowered wherein the telescoping assembly extends parallel to the longitudinal (roll) axis of the mobile unit; and
  selectively operating the light-generating means.

* * * * *